(12) United States Patent
Sakurai

(10) Patent No.: US 8,769,934 B2
(45) Date of Patent: Jul. 8, 2014

(54) EXHAUST PURIFYING SYSTEM FOR INTERNAL COMBUSTION ENGINE

(75) Inventor: Kenji Sakurai, Gotenba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 161 days.

(21) Appl. No.: 13/498,181

(22) PCT Filed: Oct. 20, 2009

(86) PCT No.: PCT/JP2009/068062
§ 371 (c)(1),
(2), (4) Date: Mar. 26, 2012

(87) PCT Pub. No.: WO2011/048666
PCT Pub. Date: Apr. 28, 2011

(65) Prior Publication Data
US 2012/0192549 A1    Aug. 2, 2012

(51) Int. Cl.
*F01N 3/00* (2006.01)
(52) U.S. Cl.
USPC ............ 60/285; 60/277; 60/290; 60/300; 60/313
(58) Field of Classification Search
USPC .................................. 60/274–324
See application file for complete search history.

(56) References Cited

U.S. PATENT DOCUMENTS

| 6,182,443 | B1 | 2/2001 | Jarvis et al. | |
| 6,192,675 | B1 | 2/2001 | Hirota et al. | |
| 6,438,945 | B1 * | 8/2002 | Takagi et al. | 60/283 |
| 2008/0286184 | A1 | 11/2008 | Ando et al. | |
| 2009/0013672 | A1 * | 1/2009 | Demura | 60/295 |

FOREIGN PATENT DOCUMENTS

| JP | 11 200844 | 7/1999 | |
| JP | 2000 230414 | 8/2000 | |
| JP | 2001 32741 | 2/2001 | |
| JP | 2002 38933 | 2/2002 | |
| JP | 2007 9810 | 1/2007 | |
| JP | 2008 279334 | 11/2008 | |
| JP | 2009 90273 | 4/2009 | |
| JP | 2009085178 A * | 4/2009 | F01N 3/08 |
| JP | 2009 97469 | 5/2009 | |

OTHER PUBLICATIONS

International Search Report Issued Jan. 26, 2010 in PCT/JP09/68062 Filed Oct. 20, 2009.

* cited by examiner

*Primary Examiner* — Jesse Bogue
(74) *Attorney, Agent, or Firm* — Oblon, Spivak, McClelland, Maier & Neustadt, L.L.P.

(57) ABSTRACT

In an internal combustion engine including an NSR catalyst and an SCR, to provide an exhaust purifying system that can limit aggravation of emissions by allowing the SCR to recover effectively from degraded performance caused by poisoning. An exhaust purifying system for an internal combustion engine capable of a lean burn operation includes an NSR catalyst disposed in an exhaust passage of the internal combustion engine; an SCR disposed downstream of the NSR catalyst; means for detecting sulfur poisoning of the SCR; and means for increasing a bed temperature of the SCR when the poisoning detecting means detects sulfur poisoning of the SCR. The temperature increasing means includes bank control, stoichiometric control, and rich spike control, any one of which is selected for performance according to an operating condition of the internal combustion engine.

5 Claims, 6 Drawing Sheets

200: Has NOx sensor 26 detected NH3 or NOx ?
202: Is SCR back pressure equal to,
     or higher than, specified value ?
204: Is torque required ?
206: Introduce secondary air
208: Ignition timing retard
210: Is SCR back pressure less than specified value ?

EXHAUST PURIFYING SYSTEM FOR INTERNAL COMBUSTION ENGINE

TECHNICAL FIELD

The present invention relates, in general, to exhaust purifying systems for internal combustion engines and, in particular, to an exhaust purifying system for an internal combustion engine including a NOx storage-reduction catalyst and a NOx selective catalytic reduction.

BACKGROUND ART

JP-A-2009-97469 discloses an exhaust purifying system including a selective catalytic reduction NOx catalyst (SCR). This system includes a three-way catalyst (TWC), a storage-reduction type NOx catalyst (NSR), and a selective reduction type NOx catalyst (SCR) disposed in sequence in an exhaust passage toward a downstream side. The NSR has a function of storing NOx contained in an exhaust gas when an air-fuel ratio of an incoming exhaust gas is lean, and reducing the NOx stored when the air-fuel ratio of the incoming exhaust gas is stoichiometric or rich and under the presence of a reducing agent. The SCR has a function of, with the supply of $NH_3$ as the reducing agent, selectively reducing NOx that has leaked downstream the NSR.

The NOx reduction reaction by the SCR with $NH_3$ as the reducing agent is an exothermic reaction and tends to progress more under low temperature environment. The related-art system described above therefore uses temperature control means for keeping a temperature of the SCR at a level equal to, or less than, a predetermined reference temperature. This maintains a condition in which the NOx reduction reaction progresses ideally in the SCR, so that a NOx purification rate by the SCR can be increased.

Patent Document 1: JP-A-2009-97469
Patent Document 2: JP-A-2007-9810
Patent Document 3: JP-A-2009-90273
Patent Document 4: JP A 2008 2797334 JP-A-2008-279334

SUMMARY OF THE INVENTION

Problem to be Solved by the Invention

The related-art system described above is adapted to keep the temperature of the SCR at a level equal to, or less than, the predetermined reference temperature with the aim of promoting progress of the reduction reaction in the SCR. However, a continued use of the SCR under low temperature environment allows sulfur poisoning to progress, which poses a problem of degraded reduction performance. The related-art system described above that performs the temperature control for the SCR with the single aim of promoting progress of the reduction reaction is therefore unable to prevent the reduction performance of the SCR from being degraded due to the sulfur poisoning and there is room for improvement.

The present invention has been made to solve the foregoing problem and it is an object of the present invention to provide, in an internal combustion engine including an SCR, an exhaust purifying system for an internal combustion engine that can limit aggravation of emissions by allowing the SCR to recover effectively from degraded performance caused by poisoning.

Means for Solving the Problems

In accomplishing the above object, according to a first aspect of the present invention, there is provided an exhaust purifying system for an internal combustion engine capable of a lean burn operation, comprising:

a NOx storage-reduction catalyst (hereinafter referred to as an NSR catalyst) disposed in an exhaust passage of the internal combustion engine;

a NOx selective catalytic reduction (hereinafter referred to as an SCR) disposed downstream of the NSR catalyst;

means for detecting sulfur poisoning of the SCR; and means for increasing a bed temperature of the SCR when the poisoning detecting means detects sulfur poisoning of the SCR.

According to a second aspect of the present invention, there is provided the exhaust purifying system for an internal combustion engine as described in the first aspect, wherein:

the internal combustion engine includes a plurality of cylinder groups;

the temperature increasing means includes means for performing a bank control in which a rich air-fuel ratio is set for a first cylinder group and a lean or stoichiometric air-fuel ratio is set for a second cylinder group; and the bank control is performed when the sulfur poisoning of the SCR is detected and a distance driven from performance of a preceding bank control is longer than a predetermined distance.

According to a third aspect of the present invention, there is provided the exhaust purifying system for an internal combustion engine as described in the second aspect, wherein:

the temperature increasing means further includes means for performing a stoichiometric control in which the internal combustion engine is operated at the stoichiometric air-fuel ratio as changed over from the lean air-fuel ratio; and the stoichiometric control is performed when the sulfur poisoning of the SCR is detected, and when the distance driven is equal to, or less than, the predetermined distance and an engine speed of the internal combustion engine is greater than a predetermined speed.

According to a fourth aspect of the present invention, there is provided the exhaust purifying system for an internal combustion engine as described in the third aspect, wherein:

the temperature increasing means further includes means for performing a rich spike control in which the air-fuel ratio of the internal combustion engine is temporarily brought to a rich air-fuel ratio; and frequency at which the rich spike control is performed is increased when the sulfur poisoning of the SCR is detected, and when the distance driven is equal to, or less than, the predetermined distance and the engine speed is equal to, or lower than, a predetermined speed.

According to a fifth aspect of the present invention, there is provided the exhaust purifying system for an internal combustion engine as described in any one of the first to fourth aspects, further comprising:

means for stopping performance by the temperature increasing means when the bed temperature of the SCR reaches a predetermined temperature.

According to a sixth aspect of the present invention, there is provided the exhaust purifying system for an internal combustion engine as described in the first aspect, further comprising:

means for determining whether a PM accumulated amount in the SCR reaches a predetermined amount; and means for supplying the SCR with secondary air, wherein:

the temperature increasing means drives the secondary air supplying means when the sulfur poisoning of the SCR is detected and the PM accumulated amount reaches the predetermined amount.

According to a seventh aspect of the present invention, there is provided the exhaust purifying system for an internal combustion engine as described in the sixth aspect, further comprising:

a pressure sensor disposed downstream of the SCR, wherein:

the determining means determines that the PM accumulated amount reaches the predetermined amount when a value detected by the pressure sensor is greater than a predetermined value.

Effects of the Invention

In the first aspect of the present invention, when the sulfur poisoning of the NOx selective catalytic reduction (SCR) is detected, a process for increasing the bed temperature of the SCR is performed. The sulfur component in the SCR is desorbed accordingly as the bed temperature increases. According to the present invention, therefore, the SCR can be recovered from the sulfur poisoning, so that aggravation of the emissions as a result of degraded reduction performance of the SCR can be effectively limited.

In the second aspect of the present invention, the bank control is performed when the sulfur poisoning of the SCR is detected and the distance driven from performance of the preceding bank control is longer than the predetermined distance. Performance of the bank control causes an exhaust gas with a rich air-fuel ratio to be introduced into the NSR catalyst, which results in an increased bed temperature of the NSR catalyst. This effectively purges sulfur adsorbed on the NSR catalyst. The increase in the bed temperature of the NSR catalyst also increases the bed temperature of the SCR disposed downstream of the NSR catalyst. According to the present invention, therefore, sulfur purging of the SCR can be performed at the same time of the sulfur purging of the NSR catalyst.

In the third aspect of the present invention, the stoichiometric control is performed, when the sulfur poisoning of the SCR is detected, and the distance driven from performance of the preceding bank control is equal to, or less than, the predetermined distance and the engine speed is greater than the predetermined speed. A stoichiometric operation in a range of the predetermined speed or higher is preferable in terms of reduced catalyst capacity and improved fuel economy as compared with the lean operation. According to the present invention, therefore, the performance of the stoichiometric control in a range in which the bank control is not performed allows the SCR to recover effectively from the sulfur poisoning, while achieving the reduced catalyst capacity and improved fuel economy.

In the fourth aspect of the present invention, the frequency at which the rich spike control is performed is increased, when the sulfur poisoning of the SCR is detected, and the distance driven from performance of the preceding bank control is equal to, or less than, the predetermined distance and the engine speed is equal to, or less than, the predetermined speed. The increased frequency at which the rich spike is performed causes the temperature of the exhaust flowing into the SCR to increase. According to the present invention, therefore, the SCR can be effectively recovered from the sulfur poisoning in a range in which neither the bank control nor the stoichiometric control is performed.

In the fifth aspect of the present invention, the performance by the temperature increasing means is stopped when the SCR reaches the predetermined bed temperature. According to the present invention, therefore, a situation in which aggravation of fuel economy or aggravation of emissions is invited as a result of excessive performance by the temperature increasing means can be effectively avoided.

In the sixth aspect of the present invention, the secondary air is supplied to the SCR, when the sulfur poisoning of the SCR is detected and the PM accumulated amount in the SCR reaches the predetermined amount. PM accumulated in the SCR is burned well under a lean environment. According to the present invention, therefore, the predetermined amount of PM accumulated in the SCR can be burned well under the lean environment, so that the bed temperature of the SCR can be increased effectively.

In the seventh aspect of the present invention, when back pressure of the SCR detected by the pressure sensor is greater than a predetermined value, it is determined that a predetermined amount of PM is accumulated in the SCR. The greater the PM accumulated amount in the SCR, the higher the back pressure of the SCR. According to the present invention, therefore, the PM accumulated amount in the SCR can be effectively determined based on the back pressure of the SCR.

BEST MODE FOR CARRYING OUT THE INVENTION

Figure 1:
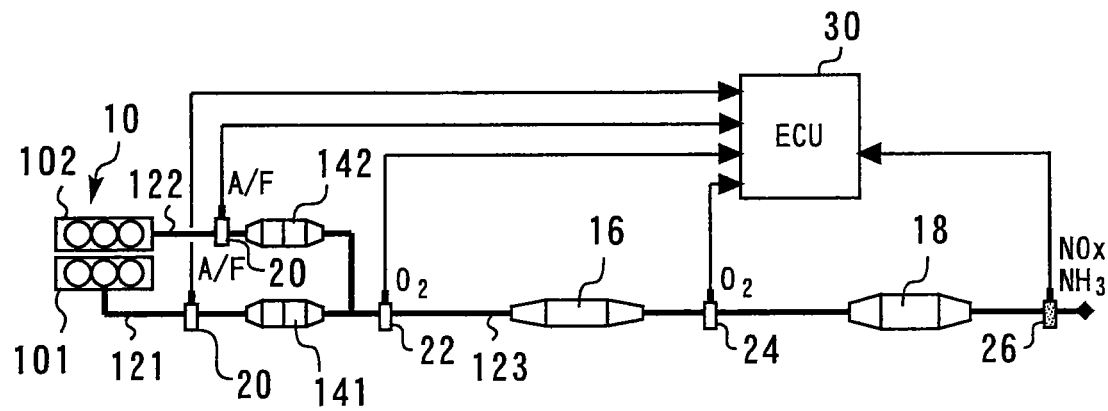
FIG. 1 is a diagram for illustrating a configuration of a first embodiment of the present invention.

Embodiments of the present invention will be described below with reference to the accompanying drawings. In the drawings, like or corresponding parts are identified by the same reference numerals and descriptions for those parts will not be duplicated. The embodiments to be described below are not intended to limit the present invention.

First Embodiment

Configuration of the First Embodiment

FIG. 1 is a diagram for illustrating a configuration of a first embodiment of the present invention. Referring to FIG. 1, a system according to this embodiment includes an internal combustion engine 10. The internal combustion engine 10 is arranged as a V-type gasoline engine including a right bank 101 and a left bank 102. A group of cylinders belonging to the right bank 101 is in communication with an exhaust passage 121. A group of cylinders belonging to the left bank 102 is in communication with an exhaust passage 122. The exhaust passages 121, 122 merge with each other at a downstream point before being brought into communication with one end of an exhaust passage 123. The exhaust passages 121, 122, and 123 will hereinafter be referred to simply as an "exhaust passage 12" unless otherwise specifically differentiated among them.

Start catalysts (hereinafter referred to as "SCs") 141, 142 as three-way catalysts are disposed on the exhaust passages 121, 122, respectively. A NOx storage-reduction catalyst (hereinafter referred to as an "NSR catalyst") 16 is disposed in the exhaust passage 123 that is disposed downstream of the SC 141, 142. Further, a NOx selective catalytic reduction (hereinafter referred to an "SCR") 18 is disposed downstream of the NSR catalyst 16 in the exhaust passage 123. The SC 141 and 142 will hereinafter be referred to simply as an "SC 14" unless otherwise specifically differentiated among them.

The internal combustion engine 10 tends to discharge HC and CO when the air-fuel ratio is rich and NOx when the air-fuel ratio is lean. In a lean environment, the SC 14 reduces NOx (purified to $N_2$), while adsorbing oxygen ($O_2$). In contrast, in a rich environment, HC and CO are oxidized (purified to $H_2O$ and $CO_2$, respectively), while oxygen is being released. In addition, under the rich environment, nitrogen and hydrogen contained in an exhaust gas react with each other to produce ammonia ($NH_3$).

The NSR catalyst 16 stores NOx contained in the exhaust gas under the lean environment. In addition, the NSR catalyst 16 releases the stored NOx under the rich environment. The NOx released under the rich environment is reduced by HC or CO. At this time, $NH_3$ is produced also in the NSR 16, as with the SC 14.

The SCR 18 has a function of storing $NH_3$ produced under the rich environment by the SC 14 and the NSR catalyst 16 and, under the lean environment, selectively reducing NOx in the exhaust gas by using $NH_3$ as a reducing agent. The SCR 18 can effectively prevent a situation, in which $NH_3$ and NOx that have leaked downstream the NSR catalyst 16 are released to the atmosphere, from occurring.

The system shown in FIG. 1 includes an air-fuel ratio (A/F) sensor 20 disposed upstream of each of the SCs 141, 142 in the exhaust passages 121, 122. The A/F sensor 20 can detect an exhaust air-fuel ratio of the internal combustion engine 10. The system shown in FIG. 1 further includes oxygen ($O_2$) sensors 22, 24 disposed upstream of the NSR catalyst 16, and downstream of the NSR catalyst 16 and upstream of the SCR 18, respectively, in the exhaust passage 123. The $O_2$ sensors 22, 24 generate a signal corresponding to oxygen concentration in the exhaust gas. In addition, a NOx sensor 26 is disposed downstream of the SCR 18 in the exhaust passage 12. The NOx sensor reacts with NOx and $NH_3$ in the exhaust gas and thereby generates signals corresponding to concentration thereof. The NOx sensor 26 can therefore detect $NH_3$ concentration under the rich environment and NOx concentration under the lean environment, respectively, on the downstream side of the SCR 18.

The system of this embodiment includes, as shown in FIG. 1, an electronic control unit (ECU) 30. Actuators of various types, including a fuel injection device (not shown), are connected to an output section of the ECU 30. The A/F sensor 20, the $O_2$ sensors 22, 24, and the NOx sensor 26 described above, and various types of other sensors for detecting operating conditions and states of the internal combustion engine 10 are connected to an input section of the ECU 30. The ECU 30 can control states of the system shown in FIG. 1 based on information of various types inputted thereto.

[Operation of the First Embodiment]
(Function of the NSR Catalyst 16)

A function of the NSR catalyst 16 will be described below. The ECU 30 normally operates the internal combustion engine 10 at a lean air-fuel ratio (a lean operation). During the lean operation, oxidizing agents, such as NOx, are discharged more than reducing agents such as HC and CO. As a result, an attempt to purify the exhaust gas by using the three-way catalyst simply results in failure to purify NOx completely due to the insufficient amount of the reducing agents. The system of the first embodiment therefore includes the NSR catalyst 16 disposed in the exhaust passage 123. The NSR catalyst 16 has a function of storing NOx as nitrate salt such as $Ba(NO_3)_2$. The system of the first embodiment can therefore effectively inhibit a situation in which the NOx is released into the atmosphere even during the lean operation.

The NSR catalyst 16, however, has NOx storage performance that is degraded as a storage amount increases. If the lean operation is run for a long time, therefore, part of NOx that has not been stored leaks downstream of the catalyst. The system of the first embodiment therefore performs rich spike control, in which NOx stored in the NSR catalyst 16 is desorbed at regular intervals. More specifically, the exhaust air-fuel ratio of the internal combustion engine 10 is temporarily made rich (e.g. A/F=12) at predetermined timing at which the storage performance of the NSR catalyst 16 is degraded. The exhaust gas during the performance of the rich spike contains a large amount of reducing agents, such as HC, CO, and $H_2$. Consequently, when these reducing agents are introduced into the NSR catalyst 16, the NOx stored as the nitrate salt is reduced to NO and desorbed from a base. The desorbed NOx is purified on the catalyst within the NSR catalyst 16 to, for example, $N_2$. As described above, the performance of the rich spike during the lean operation allows NOx stored in the NSR catalyst 16 to be desorbed, so that the NOx storage performance can be effectively recovered.

(Function of the SCR 18)

A function of the SCR 18 will be described below. As described above, the NOx storage performance of the NSR catalyst 16 can be effectively recovered by the performance of the rich spike. However, the performance of the rich spike causes part of the NOx desorbed from the NSR catalyst 16 to leak downstream. In addition, there also exists, as described earlier, NOx that leaks downstream of the NSR catalyst 16 before the performance of the rich spike. If the leaking NOx of these kinds is released into the atmosphere as is, aggravation of emissions is invited.

The system of the first embodiment is therefore adapted to include the SCR 18 that treats NOx that has leaked downstream of the NSR catalyst 16. As described earlier, the SCR 18 stores thereinside $NH_3$ produced under the rich environment by the SC 14 and the NSR catalyst 16. The SCR 18 can therefore selectively reduce and purify NOx that has leaked downstream of the NSR catalyst 16 using $NH_3$. A situation can thereby be effectively inhibited, in which NOx is released into the atmosphere and the emissions are aggravated.

In a view of the inventor of the application concerned, a reduction reaction in the SCR 18 actively takes place with a bed temperature of the SCR 18 at 500° C. or less, preferably, at around 300° C. In the system of the first embodiment, therefore, the SCR 18 is appropriately disposed such that the bed temperature of the SCR 18 is around 300° C. This effectively inhibits a situation, in which NOx is released downstream of the SCR 18, from occurring.

Characteristic Operations of the First Embodiment (Sulfur Poisoning Phenomenon of the SCR 18)

A sulfur poisoning phenomenon of the SCR 18 will be described below with reference to FIGS. 2 and 3. As described above, the SCR 18 is disposed such that the bed temperature of the SCR 18 is around 300° C. This allows the NOx reduction reaction in the SCR 18 to be activated. Meanwhile, use of the SCR 18 under low temperature environment poses a problem of serious sulfur poisoning.

Figure 2:
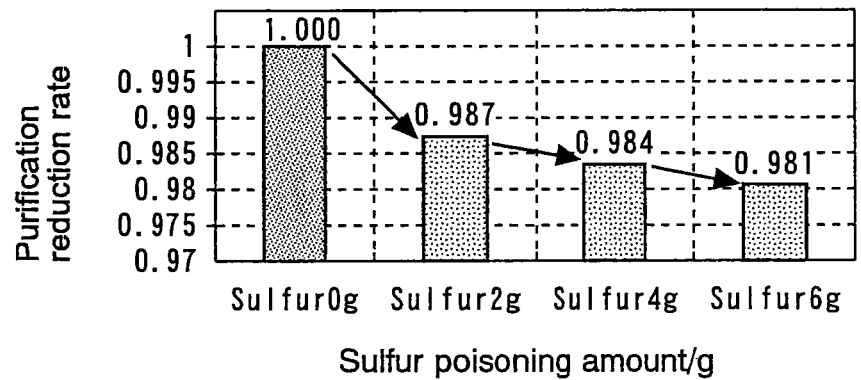
FIG. 2 is a graph showing a reduction rate of NOx purification relative to a sulfur poisoning amount.
Figure 3:
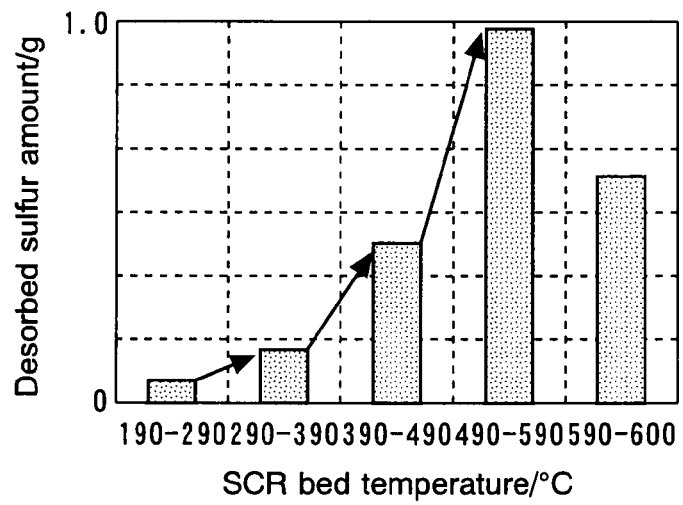
FIG. 3 is a graph showing a relationship between the SCR bed temperature and the desorbed sulfur amount.

FIG. 2 is a graph showing a reduction rate of NOx purification relative to a sulfur poisoning amount. As shown in the figure, the purification rate decreases with increasing sulfur poisoning amounts. As such, if sulfur poisoning occurs in the SCR 18, degraded purification performance results. To recover the purification performance of the SCR 18, therefore, a sulfur purging process for removing sulfur from the SCR becomes necessary.

Researches made by the inventor of the application concerned into a relationship between the SCR bed temperature and a desorbed sulfur amount have found a condition required for desorption of the sulfur. FIG. 3 is a graph showing a relationship between the SCR bed temperature and the desorbed sulfur amount. As shown in this figure, desorption of a sulfur component from the SCR starts at an SCR bed temperature of about 190° C., at which only a small amount is desorbed and, at a bed temperature of about 380 to 390° C., there is a sharp rise. This is probably because the SCR has few base points and the sulfur component is not chemically adsorbed as with the NSR catalyst. In addition, the inventor of the application concerned has found that, unlike the NSR catalyst that desorbs the sulfur component only under the rich environment and when the condition of a bed temperature of 700° C. is met, the SCR perfectly desorbs even under the lean environment or a stoichiometric environment. Consequently, the SCR can effectively desorb the sulfur component as long as a single condition of a bed temperature of 380° C. is met.

Possible methods for increasing the bed temperature of the SCR 18 include use of bank control, stoichiometric control, or the rich spike control. In the system of the first embodiment, therefore, when sulfur poisoning of the SCR 18 is detected, any one of the foregoing types of control is performed to thereby increase the bed temperature of the SCR 18 to a predetermined desorption temperature (about 380° C.). Note, however, that each of the foregoing types of control involves changing the air-fuel ratio of the internal combustion engine 10 from a lean to rich side, so that excessive performance may invite aggravation of fuel economy or emissions. In the system of the first embodiment, therefore, with characteristics of each of these types of control identified, a type of control is selected that is the most suitable for a current operating condition from a viewpoint of fuel economy, emissions, and sulfur purging performance. Use of each of these types of control will be described in detail below.

(Use of the Bank Control)

Figure 4:
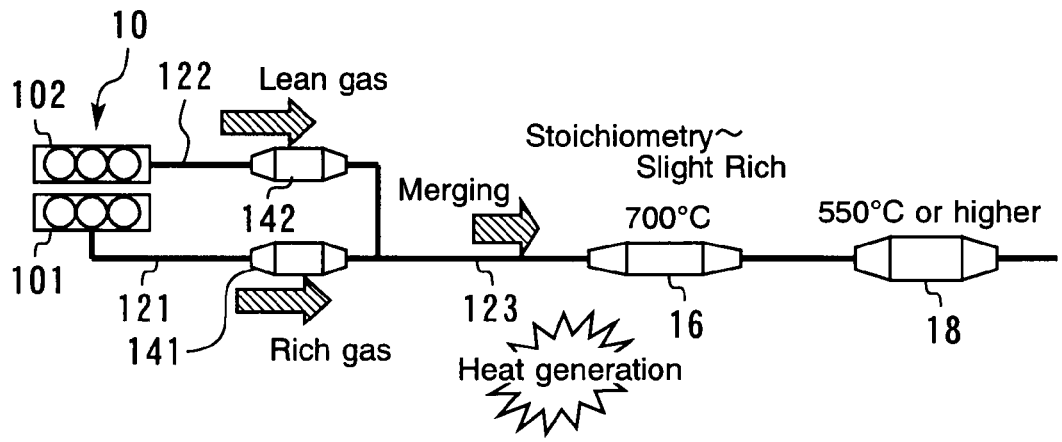
FIG. 4 is a diagram for illustrating the bank control.

A method for performing sulfur purging of the SCR 18 using the bank control in the system of the first embodiment will be described with reference to FIG. 4. The bank control is performed for sulfur purging of the NSR catalyst 16 at a frequency of every predetermined distance driven (e.g. every 3,000 km). FIG. 4 is a diagram for illustrating the bank control. As shown in the figure, when a condition for performing the bank control is met during a lean burn operation, the ECU 30 brings the air-fuel ratio of one group of cylinders (the group of cylinders on the right bank 101 in the figure) to a rich side. This causes rich gas to flow through the exhaust passage 121 and lean gas to flow through the exhaust passage 122, and these types of gas merge in the exhaust passage 123. The stoichiometric to slight rich exhaust gas after the merging is introduced into the NSR catalyst 16 and then undergoes an exothermic reaction with, for example, NOx to be heated to about 700° C. Given the condition of a bed temperature of 700° C. and the rich environment, the NSR catalyst 16 can perform sulfur purging effectively.

When the bank control is performed, the bed temperature of the SCR 18 disposed downstream of the NSR catalyst 16 also increases to 550° C. or higher. If it is arranged such that the bank control is performed when the sulfur poisoning of the SCR 18 is detected, therefore, sulfur purging of the SCR 18 can be effectively performed at the same time of the sulfur purging of the NSR catalyst 16.

As described earlier, however, the bank control is to be generally performed at every distance driven of about 3,000 km and excessive performance invites serious aggravation of fuel economy and emissions. In the system of the first embodiment, therefore, it is determined whether the bank control can be performed according to the distance driven when the sulfur poisoning of the SCR 18 is detected. More specifically, if the distance driven from a preceding bank control falls within a range near the normal distance driven (3,000 km), e.g., a range within −200 km, when the sulfur poisoning of the SCR 18 is detected, the bank control in question is performed ahead of schedule. When the bank control is performed, the sulfur purging of the SCR 18 is performed at the same time of the sulfur purging of the NSR catalyst 16. This allows aggravation of fuel economy and emissions to be limited as compared when the sulfur purging of the SCR 18 is performed separately independently.

(Use of the Stoichiometric Control)

A method for performing the sulfur purging of the SCR 18 using the stoichiometric control in the system of the first embodiment will be described below. As described earlier, the bank control is suitable in that the sulfur poisoning of the SCR can be performed at the same time of the sulfur purging of the NSR catalyst 16. However, the bank control is performed at every distance driven of about 3,000 km and is thus not readily performable whenever the sulfur poisoning of the SCR 18 is detected. As a result, when the sulfur poisoning of the SCR 18 progresses resulting in degraded catalytic performance, NOx is released downstream of the SCR 18, which may aggravate emissions.

When the internal combustion engine 10 is in an operating condition of an acceleration pattern, specifically, in an operating range with an engine speed of 2,500 rpm or more and torque of 400 Nm or more, the stoichiometric control that changes the lean burn operation to a stoichiometric operation is performed. This arrangement improves fuel economy and reduces the capacity of the catalyst as compared with a case in which the lean burn operation is performed throughout the entire operating range.

When the stoichiometric control is performed, the reducing agent contained in stoichiometric gas is served for a chemical reaction in the NSR catalyst 16, which increases an exhaust gas temperature in the NSR catalyst 16. Depending on the frequency at which the stoichiometric control is performed, therefore, the bed temperature of the SCR 18 can also be increased to a level (380 to 390° C.) at which the sulfur purging is possible.

Therefore, in the system of the first embodiment, if the sulfur poisoning of the SCR 18 is detected in a range in which the above-described bank control is not performed, when the sulfur poisoning of the SCR 18 is detected, a threshold value of the speed as one of the conditions for performing the stoichiometric control is set low. More specifically, the threshold value is set to a predetermined value (e.g. 2,300 rpm or more) in consideration of, for example, the degree at which the bed temperature of the SCR 18 increases and at which fuel economy is aggravated. This increases the frequency at which the stoichiometric control is performed in the range in which the bank control is not performed. This allows the sulfur purging of the SCR 18 to be performed, while limiting aggravation of emissions and fuel economy as much as feasible.

(Use of the Rich Spike Control)

Figure 5:
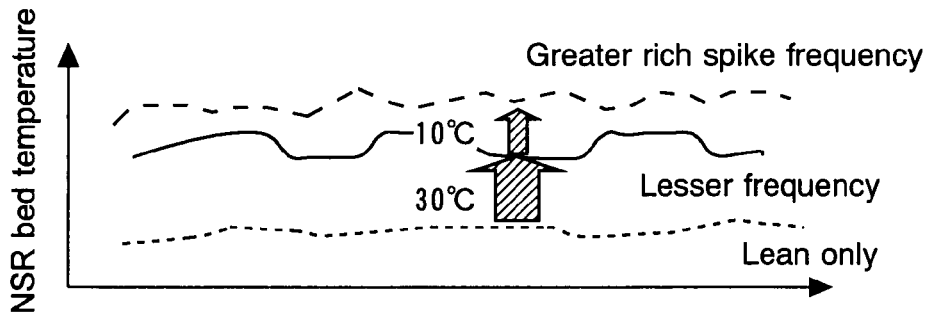
FIG. 5 is a graph for illustrating a relationship between the frequency of the rich spike control and a temperature increase in the NSR catalyst 16.

A method for performing the sulfur purging of the SCR 18 using the rich spike control in the system of the first embodiment will be described below with reference to FIG. 5. As described earlier, the rich spike control changes the exhaust air-fuel ratio of the internal combustion engine 10 temporarily toward a rich side at predetermined timing at which the storage performance of the NSR catalyst 16 is degraded. This allows NOx stored in the NSR catalyst 16 to be purified effectively. When the rich spike control is performed, a chemical reaction in the NSR catalyst 16 causes the bed temperature of the NSR catalyst 16 to increase. FIG. 5 is a graph for illustrating a relationship between the frequency of the rich spike control and a temperature increase in the NSR catalyst 16. As shown in the figure, it is known that the more the frequency of the rich spike, the higher the bed temperature of the SCR 18 increases. As a result, depending on the frequency at which the rich spike control is performed, the bed temperature of the SCR 18 disposed downstream can be increased to a level (380 to 390° C.) at which the sulfur purging is possible.

Therefore, in the system of the first embodiment, if the sulfur poisoning of the SCR 18 is detected in a range in which neither the above-described bank control nor the stoichiometric control is performed, the frequency at which the rich spike control is performed is increased. An amount of increase in the frequency is determined comprehensively, for example, the degree at which fuel economy is aggravated, at which emissions are aggravated, and at which the bed temperature of the SCR 18 increases. This allows the sulfur purging of the SCR 18 to be performed, while limiting aggravation of emissions and fuel economy as much as feasible, in the range in which neither the above-described bank control nor the stoichiometric control is performed.

[Specific Processes in the First Embodiment]

Figure 6:
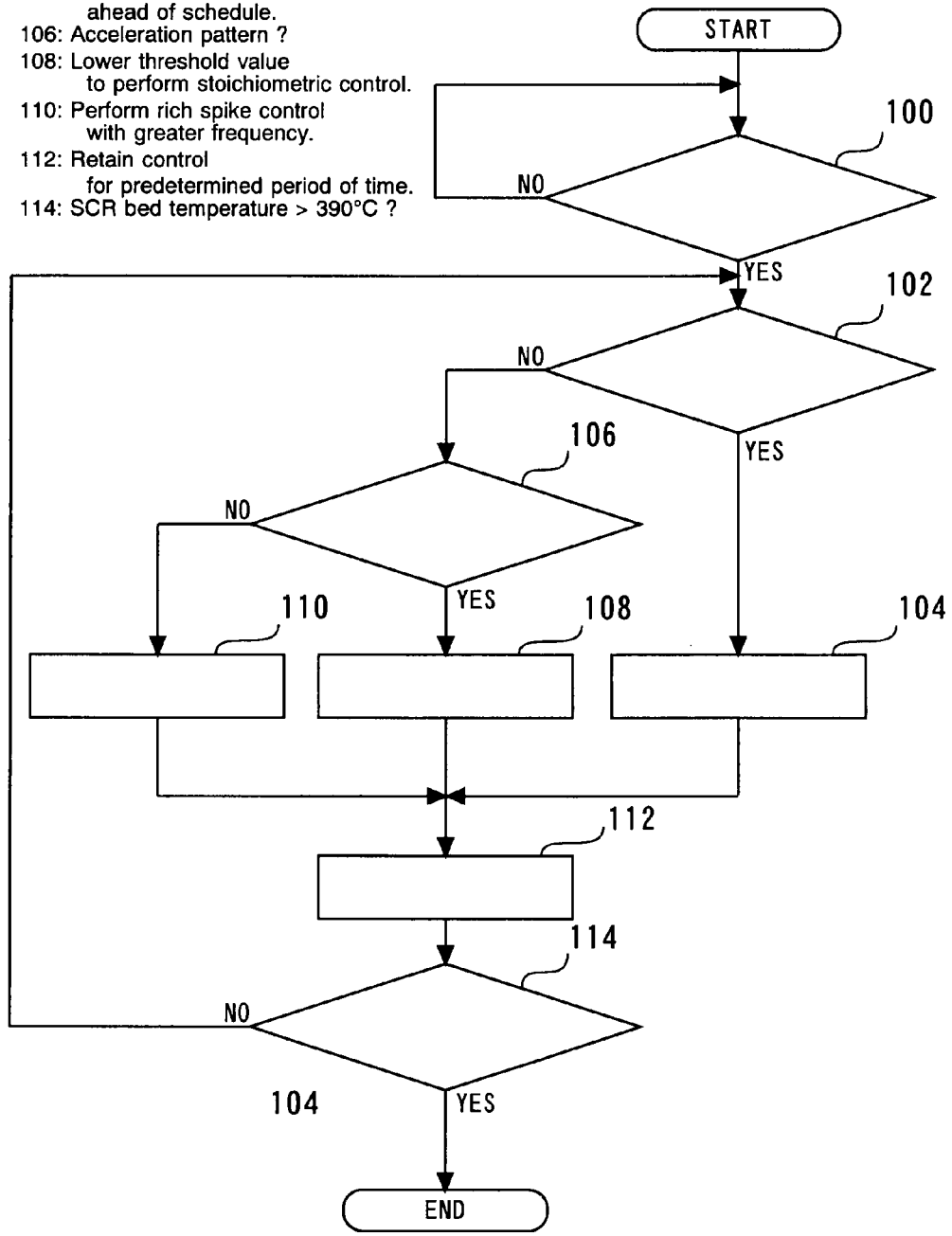
FIG. 6 is a flow chart showing a routine executed in Embodiment 1 of the present invention.

Specific processes performed in this embodiment will be described below with reference to FIG. 6. FIG. 6 is a flow chart showing a routine, through which the ECU 30 performs the sulfur purging of the SCR 18. Note that the routine shown in FIG. 6 is to be performed repeatedly during the lean burn operation of the internal combustion engine 10.

In the routine shown in FIG. 6, it is first determined whether sulfur poisoning of the SCR 18 progresses (step 100). Specifically, it is here determined whether the NOx sensor 26 has detected NOx or $NH_3$. If it is, as a result, determined that the NOx sensor 26 is yet to detect NOx or $NH_3$, it is then determined that the catalytic performance of the SCR 18 is not degraded, specifically, the sulfur poisoning of the SCR 18 is yet to progress, so that this step is repeatedly performed.

If it is determined, in step 100, that the NOx sensor 26 has detected NOx or $NH_3$, it is then determined that the catalytic performance of the SCR 18 is degraded, specifically, the sulfur poisoning of the SCR 18 progresses. The process proceeds to a next step and it is determined whether the condition for performing the bank control ahead of schedule is met (step 102). Specifically, it is here determined whether the distance driven from a preceding bank control falls within a predetermined distance that is near a distance of performance of the bank control, specifically, a range within −200 km relative to a distance of performance of 3,000 km.

If it is determined, as a result of step 102, that the distance driven falls within the predetermined distance, it is then determined that the condition for performing the bank control ahead of schedule is met. The process then proceeds to a next step and the bank control is performed (step 104). Specifically, the group of cylinders of either the right bank 101 or the left bank 102 is operated at a rich air-fuel ratio.

If it is determined in step 102 that the distance driven does not fall within the predetermined distance, it is then determined that the condition for performing the bank control ahead of schedule is not met. The process then proceeds to a next step and it is determined whether the operating condition of the internal combustion engine 10 is the acceleration pattern (step 106). Specifically, it is here determined whether the engine speed of the internal combustion engine 10 is a predetermined speed near 2,500 rpm, specifically, a range of −200 rpm with reference to 2,500 rpm. If it is as a result determined that the engine speed falls within the range of the predetermined speed, the process proceeds to a next step and the stoichiometric control with a reduced threshold value is performed (step 108). Specifically, the threshold value of the engine speed as one of the conditions for performing the stoichiometric control is reduced from 2,500 rpm to 2,300 rpm.

If it is determined in step 106 that the engine speed does not fall within the range of the predetermined speed, the process proceeds to a next step and the rich spike control with greater frequency of performance is performed (step 110).

After the bank control in step 104, the stoichiometric control in step 108, or the rich spike control in step 110 is performed, the specific control being performed is carried on for a predetermined period of time (step 112). Specifically, the degree of aggravation in the purification rate of the SCR 18 is here estimated using a detection signal of the NOx sensor 26 detected in step 100. Then, based on the estimated degree of aggravation and a current air amount, the period of time over which the control in question is carried on is calculated.

It is next determined whether the bed temperature of the SCR 18 has exceeded 390° C. (step 114). If it is determined as a result that the bed temperature is yet to reach 390° C., it is determined that the sulfur purging of the SCR 18 is not sufficient yet. Then, the routine is performed again starting with step 102. If, on the other hand, it is determined in step 114 that the bed temperature has reached 390° C., it is then determined that the sulfur purging of the SCR 18 is completed and this routine is terminated forthwith.

As described heretofore, in the system of the first embodiment, when the sulfur poisoning of the SCR 18 is detected, control is performed for increasing the bed temperature of the SCR 18 to 390° C. This allows the sulfur purging of the SCR 18 to be performed effectively.

In the system of the first embodiment, when the bed temperature of the SCR 18 is to be increased, optimum control that can limit aggravation of emissions and aggravation of fuel economy can be selected and performed based on the operating condition of the internal combustion engine 10. This allows limitation of aggravation of emissions and aggravation of fuel economy during the sulfur purging of the SCR 18 to be maximized.

In the system of the first embodiment, the sulfur poisoning state of the SCR 18 is detected based on the output signal from the NOx sensor 26. This is, however, not the only possible method for detecting the sulfur poisoning. Specifically, an amount of sulfur adsorbed on the SCR 18 may be estimated based on such information as time from sulfur purging, an exhaust gas amount, air-fuel ratio, and the bed temperature of the SCR.

The NSR catalyst 16 in the first embodiment described above corresponds to the "NSR catalyst" in the first aspect of the present invention, the SCR 18 in the first embodiment corresponds to the "SCR" in the first aspect of the present invention, and the NOx sensor 26 in the first embodiment corresponds to the "sulfur poisoning detecting means" in the first aspect of the present invention. Similarly, the performance of the process of step 104, 108, or 110 by the ECU 30 in the first embodiment described above achieves the "temperature increasing means" in the first aspect of the present invention.

Additionally, the performance of the process of step 104 by the ECU 30 in the first embodiment described above achieves the "bank control means" in the second aspect of the present invention.

Additionally, the performance of the process of step 108 by the ECU 30 in the first embodiment described above achieves the "stoichiometric control means" in the third aspect of the present invention.

Additionally, the performance of the process of step 110 by the ECU 30 in the first embodiment described above achieves the "rich spike control means" in the fourth aspect of the present invention.

Additionally, the performance of the process of step 114 by the ECU 30 in the first embodiment described above achieves the "stopping means" in the fifth aspect of the present invention.

Second Embodiment

Characteristics of the Second Embodiment

A second embodiment of the present invention will be described below with reference to FIGS. 7 and 8. The second embodiment can be achieved by a system shown in FIG. 7 that performs a routine shown in FIG. 8 to be described later.

Figure 7:
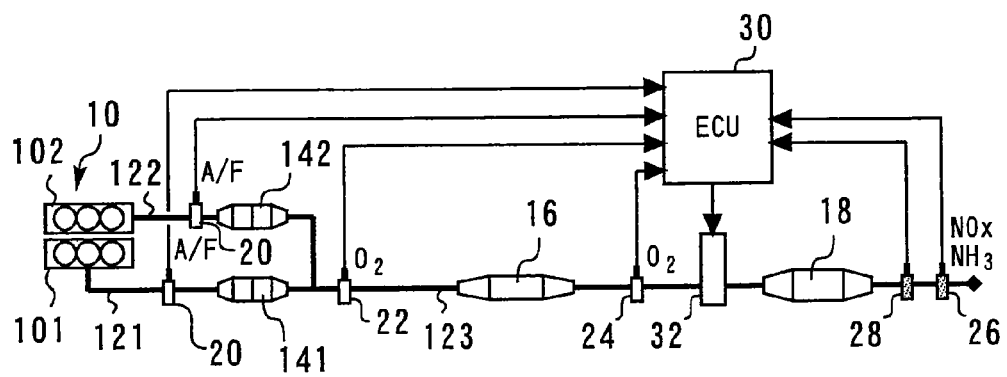
FIG. 7 is a diagram for illustrating a configuration of the second embodiment.

FIG. 7 is a diagram for illustrating a configuration of the second embodiment. In the system shown in FIG. 7, like or corresponding parts are identified by the same reference numerals as those used for the system shown in FIG. 1 and descriptions for those parts will be omitted. Referring to FIG. 7, the system of this embodiment includes a secondary air injection unit 32 disposed upstream of an SCR 18 and downstream of an NSR catalyst 16 in an exhaust passage 123. The secondary air injection unit 32 can inject secondary air toward the exhaust passage 123 upstream of the SCR 18. In addition, a pressure sensor 28 for detecting back pressure of the SCR 18 is disposed downstream of the SCR 18 in the exhaust passage 123.

A substantially total amount of the catalyst component of the SCR 18 is formed of zeolite. The SCR 18 therefore has a property of readily trapping PM contained in the exhaust gas. In the system according to the second embodiment, therefore, the bed temperature of the SCR 18 is increased by burning the PM trapped in the SCR 18 to thereby perform the sulfur purging.

In a view of the inventor of the application concerned on combustion of the PM, good combustion can be achieved under the stoichiometric environment in continuous burning, but combustion of accumulated PM is good under the lean environment. In the system according to the second embodiment, therefore, the secondary air is injected from the secondary air injection unit 32 when to burn the PM accumulated in the SCR 18. This causes the lean environment to develop in the SCR 18, so that PM combustion can be activated to thereby increase the bed temperature of the SCR 18 effectively. As a result, the sulfur purging can be effectively performed, while the PM accumulated in the SCR 18 is being treated.

[Specific Processes in the Second Embodiment]

Specific processes performed in this embodiment will be described below with reference to FIG. 8. FIG. 8 is a flow chart showing a routine performed in the system of the second embodiment.

Figure 8:
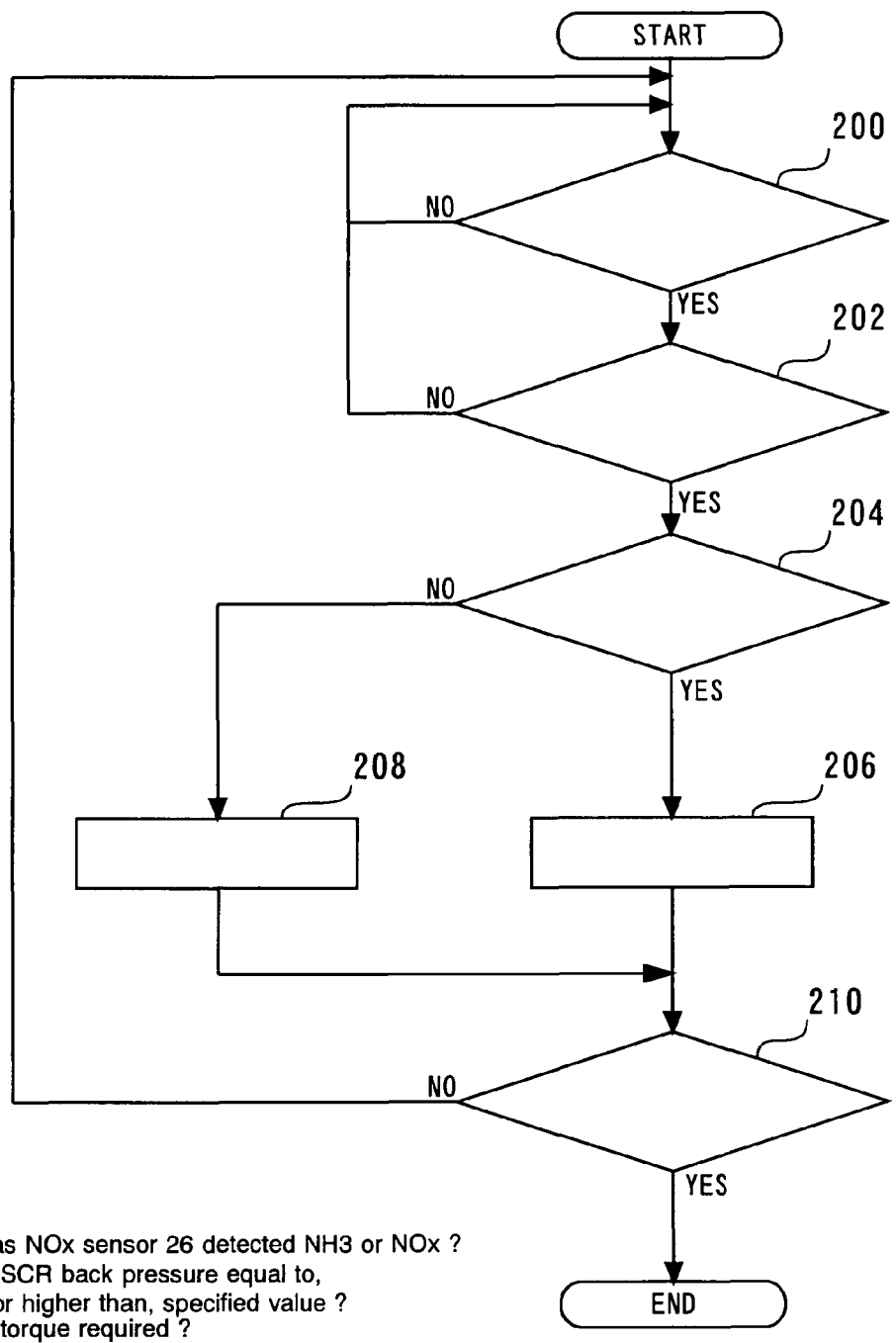
FIG. 8 is a flow chart showing a routine executed in Embodiment 2 of the present invention.

In the routine shown in FIG. 8, it is first determined whether sulfur poisoning of the SCR 18 progresses (step 200). Specifically, the same process as that of step 100 is here performed. If it is, as a result, determined that the NOx sensor 26 is yet to detect NOx or $NH_3$, it is then determined that the catalytic performance of the SCR 18 is not degraded, specifically, the sulfur poisoning of the SCR 18 is yet to progress, so that this step is repeatedly performed.

If it is determined, in step 200, that the NOx sensor 26 has detected NOx or $NH_3$, it is then determined that the catalytic performance of the SCR 18 is degraded, specifically, the sulfur poisoning of the SCR 18 progresses. The process proceeds to a next step and it is determined whether a predetermined amount of PM is accumulated in the SCR (step 202). Specifically, it is here determined whether the back pressure of the SCR 18 detected by the pressure sensor 28 is greater than a predetermined value. If, as a result, it is not determined that the back pressure>the predetermined value holds, it is then determined that an amount of PM sufficient for the bed temperature of the SCR 18 to be increased to a predetermined temperature is yet to be accumulated in the SCR 18. Then, the routine is performed again starting with step 200.

If it is determined in step 202 that the back pressure>the predetermined value holds, it is then determined that a good amount of PM is accumulated in the SCR 18. The process then proceeds to a next step and it is determined whether a current operating condition of the internal combustion engine 10 requires torque (step 204). If it is determined as a result that the internal combustion engine 10 requires torque, it is then determined that the torque needs to be given priority. The process then proceeds to a next step and secondary air is introduced (step 206). Specifically, the secondary air injection unit 32 is here driven to thereby inject secondary air into the exhaust passage 123 upstream of the SCR 18. The secondary air introduced into the exhaust passage 123 is introduced into the downstream SCR 18. Combustion of PM increases the bed temperature of the SCR 18, which performs the sulfur purging.

If it is determined, on the other hand, that the internal combustion engine 10 does not require torque, it is then determined that there is no need to give torque priority. The process then proceeds to a next step and ignition retard control is performed (step 208). Specifically, ignition timing is here retarded and an exhaust temperature is increased. This increases the bed temperature of the SCR 18 and sulfur purging is performed.

In the routine shown in FIG. 8, following step 206 or 208, it is determined whether the back pressure of the SCR 18 is reduced to less than a predetermined value (step 210). If it is not determined as a result that the back pressure<the predetermined value holds, it is then determined that the sulfur purging is not completed. This routine is then performed again starting with step 200. If it is determined in step 210 that the back pressure<the predetermined value holds, it is then determined that the sulfur purging is completed and this routine is terminated forthwith.

As described heretofore, in the system of the second embodiment, effectively burning the PM trapped in the SCR 18 under the lean environment allows the bed temperature of the SCR 18 to be increased effectively. The sulfur purging of the SCR 18 can thereby be effectively performed.

In the second embodiment described above, it is determined whether the amount of PM accumulated in the SCR 18 has reached a predetermined amount based on the back pressure of the SCR 18 detected by the pressure sensor 28. This is, however, not the only possible method for determining the amount of PM accumulated. Specifically, the amount of PM accumulated in the SCR 18 may be estimated based on such information as time from sulfur purging, an exhaust gas amount, and the air-fuel ratio.

The performance of the process of step 202 by the ECU 30 in the second embodiment described above achieves the "determining means" in the sixth aspect of the present invention. The performance of the process of step 206 by the ECU 30 in the second embodiment achieves the "temperature increasing means" in the sixth aspect of the present invention.

Third Embodiment

Characteristics of the Third Embodiment

A third embodiment of the present invention will be described below with reference to FIGS. 9 and 10. In a view of the inventor of the application concerned, the SCR 18 containing Fe as a base metal can efficiently store $NH_3$. This is considered to be because, in the SCR 18 of an Fe-based zeolite, a reversible reaction in which the stored $NH_3$ is converted back to NOx is less likely to occur. The inventor of the application concerned therefore conducted an experiment with a special attention focused on a relationship between weight percent (wt %) of Fe content in the SCR 18 and a NOx purification rate ηNOx (%) and has found that a predetermined correlation exists therebetween.

Figure 9:
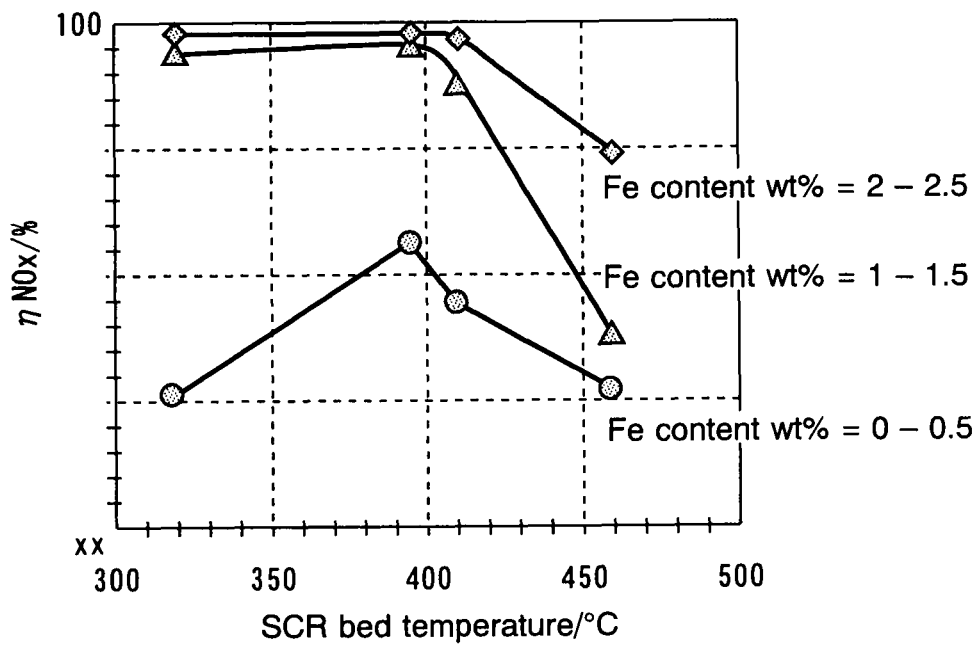
FIG. 9 is a graph showing the NOx purification rate ηNOx (%) relative to the Fe content (wt %).

FIG. 9 is a graph showing the NOx purification rate ηNOx (%) relative to the Fe content (wt %). As shown in the figure, the higher the Fe content (wt %), the higher the NOx purification rate ηNOx (%). At a temperature near 300 that is an operating temperature of the SCR in particular, the NOx purification rate is excessively high in cases with 1 or more of the Fe content (wt %).

Meanwhile, the inventor of the application concerned conducted an experiment with a special attention focused on a relationship between the weight percent (wt %) of the base metal Fe contained in the SCR 18 and the sulfur poisoning amount of the SCR 18 and has found that a predetermined correlation exists therebetween.

Figure 10:
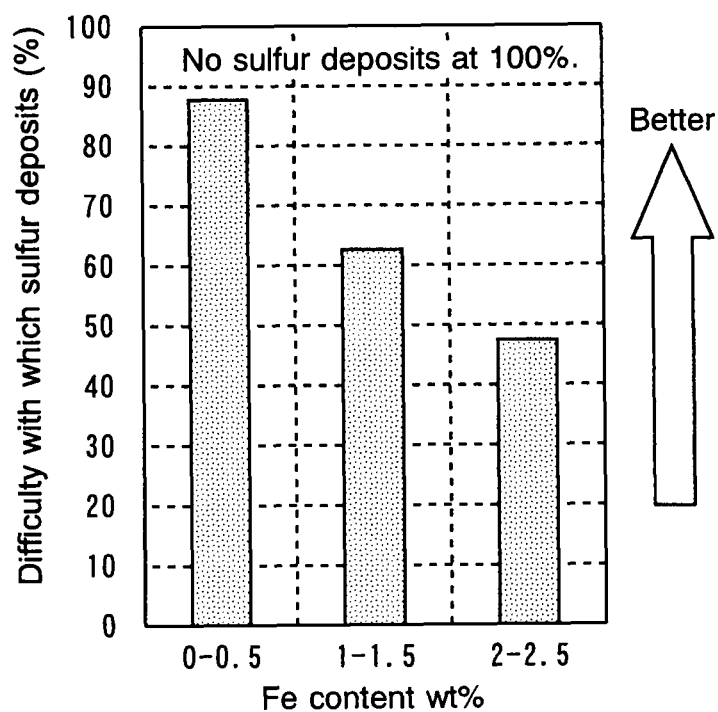
FIG. 10 is a graph showing a relationship between the Fe content (wt %) in the SCR 18 and difficulty with which sulfur deposits on the SCR 18 (%).

FIG. 10 is a graph showing a relationship between the Fe content (wt %) in the SCR 18 and difficulty with which sulfur deposits on the SCR 18 (%). Note that the difficulty with which sulfur deposits (%) is 100% when no sulfur deposits. As shown in this figure, the difficulty with which sulfur deposits (%) is more severe (higher %) with lower Fe content (wt %). This indicates that the sulfur is more difficult to deposit with lower Fe content (wt %) in the SCR 18.

Specifically, the Fe content (wt %) of the SCR 18 is preferably higher in terms of the NOx purification rate and lower in terms of the sulfur poisoning amount. In the third embodiment, therefore, the Fe content (wt %) is determined in consideration of the operating temperature range, the difficulty in being poisoned, and the NOx purification rate of the SCR 18.

This allows the NOx purification performance to be ensured and the sulfur poisoning to be limited in the SCR 18.

DESCRIPTION OF REFERENCE CHARACTERS

10: internal combustion engine (engine)
12: exhaust passage
14: start catalyst (SC)
16: NOx storage-reduction catalyst (NSR catalyst)
18: NOx selective catalytic reduction (SCR)
20: A/F sensor
22: $O_2$ sensor
24: $O_2$ sensor
26: NOx sensor
30: ECU (electronic control unit)
32: secondary air injection unit

The invention claimed is:

1. An exhaust purifying system for an internal combustion engine capable of a lean burn operation, comprising:
    a NOx storage-reduction catalyst (NSR catalyst) disposed in an exhaust passage of the internal combustion engine;
    a NOx selective catalytic reduction (SCR) disposed downstream of the NSR catalyst;
    means for detecting sulfur poisoning of the SCR; and
    means for increasing a bed temperature of the SCR when the poisoning detecting means detects sulfur poisoning of the SCR, wherein:
    the internal combustion engine includes a plurality of cylinder groups;
    the temperature increasing means includes means for performing a bank control in which a rich air-fuel ratio is set for a first cylinder group and a lean or stoichiometric air-fuel ratio is set for a second cylinder group; and
    the bank control is performed when the sulfur poisoning of the SCR is detected and a distance driven from performance of a preceding bank control is longer than a predetermined distance.

2. The exhaust purifying system for an internal combustion engine according to claim 1, wherein:
    the temperature increasing means further includes means for performing a stoichiometric control in which the internal combustion engine is operated at the stoichiometric air-fuel ratio as changed over from the lean air-fuel ratio; and
    the stoichiometric control is performed when the sulfur poisoning of the SCR is detected, and when the distance driven is equal to, or less than, the predetermined distance and an engine speed of the internal combustion engine is greater than a predetermined speed.

3. The exhaust purifying system for an internal combustion engine according to claim 2, wherein:
    the temperature increasing means further includes means for performing a rich spike control in which the air-fuel ratio of the internal combustion engine is temporarily brought to a rich air-fuel ratio; and
    frequency at which the rich spike control is performed is increased when the sulfur poisoning of the SCR is detected, and when the distance driven is equal to, or less than, the predetermined distance and the engine speed is equal to, or lower than, a predetermined speed.

4. The exhaust purifying system for an internal combustion engine according to claim 1, further comprising:
    means for stopping performance by the temperature increasing means when the bed temperature of the SCR reaches a predetermined temperature.

5. An exhaust purifying system for an internal combustion engine capable of a lean burn operation, comprising:

a NOx storage-reduction catalyst (NSR catalyst) disposed in an exhaust passage of the internal combustion engine;

a NOx selective catalytic reduction (SCR) disposed downstream of the NSR catalyst;

a NOx sensor for detecting sulfur poisoning of the SCR; and an electronic control unit including instructions for increasing a bed temperature of the SCR when the NOx sensor detects sulfur poisoning of the SCR, wherein:

the internal combustion engine includes a plurality of cylinder groups;

the electronic control unit including instructions for performing a bank control in which a rich air-fuel ratio is set for a first cylinder group and a lean or stoichiometric air-fuel ratio is set for a second cylinder group; and the bank control is performed when the sulfur poisoning of the SCR is detected and a distance driven from performance of a preceding bank control is longer than a predetermined distance.

* * * * *